United States Patent
Dehmann et al.

(10) Patent No.: US 9,836,208 B2
(45) Date of Patent: Dec. 5, 2017

(54) METHOD FOR DISPLAYING INFORMATION IN A MOTOR VEHICLE WITH A VARIABLE SCALE AND DISPLAY DEVICE

(75) Inventors: Rainer Dehmann, Berlin (DE); Gustav Hofmann, Braunschweig (DE); Mathias Kuhn, Berlin (DE)

(73) Assignee: Volkswagen AG, Wolfsburg (DE)

( * ) Notice: Subject to any disclaimer, the term of this patent is extended or adjusted under 35 U.S.C. 154(b) by 1296 days.

(21) Appl. No.: 12/674,385

(22) PCT Filed: Aug. 6, 2008

(86) PCT No.: PCT/EP2008/060343
§ 371 (c)(1),
(2), (4) Date: Jul. 27, 2011

(87) PCT Pub. No.: WO2009/024468
PCT Pub. Date: Feb. 26, 2009

(65) Prior Publication Data
US 2011/0273477 A1    Nov. 10, 2011

(30) Foreign Application Priority Data
Aug. 21, 2007   (DE) .......................... 10 2007 039 446

(51) Int. Cl.
*G09G 5/00* (2006.01)
*G06F 3/0488* (2013.01)
(Continued)

(52) U.S. Cl.
CPC ......... *G06F 3/04883* (2013.01); *G01C 21/26* (2013.01); *G06F 3/0481* (2013.01); *G06F 2203/04806* (2013.01)

(58) Field of Classification Search
USPC .................................. 345/661, 443; 701/432
See application file for complete search history.

(56) References Cited

U.S. PATENT DOCUMENTS

| | | | |
|---|---|---|---|
| 4,672,370 A | * | 6/1987 | Yu .................................. 345/17 |
| 4,686,522 A | * | 8/1987 | Hernandez et al. .......... 345/160 |

(Continued)

FOREIGN PATENT DOCUMENTS

| | | |
|---|---|---|
| DE | 44 46 431 | 6/1996 |
| DE | 198 37 510 | 2/2000 |

(Continued)

OTHER PUBLICATIONS

Almy, et al., "User interface for zooming of graphic displays," Research Disclosure, Mason Publications, Hampshire, GB, vol. 312, No. 46, Apr. 1, 1990.

(Continued)

*Primary Examiner* — M Good Johnson
(74) *Attorney, Agent, or Firm* — Andrews Kurth Kenyon LLP

(57) ABSTRACT

In a method for displaying information with the aid of a display mounted in a motor vehicle, a user-interface device generates graphics data that control the display such that a graphical object is displayed in which a display content is shown in a specific scale, and one pixel of the display is selected with the aid of an input device, and a line is drawn on the display starting from this pixel. The scale of the display content is altered as a function of the length of the line. A display device for a motor vehicle can implement the method.

13 Claims, 3 Drawing Sheets

(51) Int. Cl.
*G01C 21/26* (2006.01)
*G06F 3/0481* (2013.01)

(56) References Cited

U.S. PATENT DOCUMENTS

| | | | | |
|---|---|---|---|---|
| 5,502,803 | A * | 3/1996 | Yoshida et al. | 715/201 |
| 5,689,284 | A | 11/1997 | Herget | |
| 5,751,275 | A | 5/1998 | Bullister | |
| 5,844,547 | A * | 12/1998 | Minakuchi et al. | 345/173 |
| 5,880,743 | A * | 3/1999 | Moran et al. | 345/473 |
| 6,052,110 | A | 4/2000 | Sciammarella et al. | |
| 6,188,432 | B1 * | 2/2001 | Ejima | 348/240.99 |
| 6,388,684 | B1 * | 5/2002 | Iwamura et al. | 715/788 |
| 6,430,501 | B1 | 8/2002 | Slominski | |
| 6,448,987 | B1 | 9/2002 | Easty et al. | |
| 6,452,570 | B1 | 9/2002 | Kuenzner | |
| 6,538,635 | B1 | 3/2003 | Ringot | |
| 6,590,583 | B2 * | 7/2003 | Soohoo | 345/660 |
| 6,642,936 | B1 | 11/2003 | Engholm et al. | |
| 6,769,320 | B1 | 8/2004 | Bollgohn et al. | |
| 6,898,523 | B2 | 5/2005 | Cochlovius et al. | |
| 6,956,540 | B1 | 10/2005 | Yoshihara et al. | |
| 6,958,749 | B1 * | 10/2005 | Matsushita et al. | 345/175 |
| 7,111,788 | B2 | 9/2006 | Reponen | |
| 7,142,237 | B2 * | 11/2006 | Nozawa | 348/240.2 |
| 7,154,544 | B2 * | 12/2006 | Kowno et al. | 348/240.99 |
| 7,317,449 | B2 | 1/2008 | Robbins et al. | |
| 7,327,349 | B2 * | 2/2008 | Robbins et al. | 345/156 |
| 7,439,969 | B2 * | 10/2008 | Chithambaram et al. | 345/418 |
| 7,486,315 | B2 * | 2/2009 | Naka | 348/240.99 |
| 7,620,496 | B2 * | 11/2009 | Rasmussen | 701/455 |
| 7,626,599 | B2 * | 12/2009 | de Souza | 345/661 |
| 7,730,425 | B2 | 6/2010 | de los Reyes | |
| 7,773,075 | B2 * | 8/2010 | Otsuka et al. | 345/173 |
| 7,814,419 | B2 * | 10/2010 | Fabritius | 715/702 |
| 7,865,301 | B2 * | 1/2011 | Rasmussen et al. | 701/457 |
| 7,966,577 | B2 | 6/2011 | Chaudhri et al. | |
| 8,028,250 | B2 | 9/2011 | Vronay et al. | |
| 8,151,210 | B2 * | 4/2012 | Nezu et al. | 715/804 |
| 8,327,291 | B2 * | 12/2012 | Oguchi | 715/790 |
| 8,677,268 | B2 * | 3/2014 | Capela et al. | 715/800 |
| 2001/0013897 | A1 * | 8/2001 | Kowno et al. | 348/240 |
| 2002/0041260 | A1 | 4/2002 | Grassmann | |
| 2003/0001869 | A1 * | 1/2003 | Nissen | 345/672 |
| 2003/0164818 | A1 | 9/2003 | Miller-Smith | |
| 2004/0107043 | A1 * | 6/2004 | de Silva | 701/200 |
| 2005/0267676 | A1 * | 12/2005 | Nezu et al. | 701/200 |
| 2006/0206264 | A1 * | 9/2006 | Rasmussen | 701/212 |
| 2007/0109323 | A1 * | 5/2007 | Nakashima | 345/661 |
| 2007/0143676 | A1 * | 6/2007 | Chen | 715/700 |
| 2007/0157126 | A1 | 7/2007 | Tschirhart et al. | |
| 2008/0036771 | A1 * | 2/2008 | Bae | 345/442 |
| 2008/0161997 | A1 | 7/2008 | Wengelnik et al. | |

FOREIGN PATENT DOCUMENTS

| | | |
|---|---|---|
| DE | 100 01 988 | 7/2001 |
| DE | 199 41 955 | 8/2001 |
| DE | 100 39 432 | 12/2001 |
| DE | 100 58 244 | 5/2002 |
| DE | 101 17 030 | 10/2002 |
| DE | 101 18 765 | 5/2003 |
| DE | 101 55 549 | 5/2003 |
| DE | 103 03 792 | 8/2004 |
| DE | 103 05 341 | 8/2004 |
| DE | 600 18 874 | 7/2005 |
| DE | 601 06 175 | 11/2005 |
| DE | 10 2004 029 203 | 12/2005 |
| DE | 10 2004 048 956 | 4/2006 |
| DE | 10 2005 035 111 | 9/2006 |
| DE | 10 2005 017 313 | 10/2006 |
| DE | 10 2006 002 679 | 8/2007 |
| EP | 0 547 993 | 6/1993 |
| EP | 1 052 566 | 11/2000 |
| EP | 1 207 072 | 5/2002 |
| EP | 1 212 208 | 6/2002 |
| EP | 1 560 102 | 8/2005 |
| GB | 2 434 068 | 7/2007 |
| JP | 2003-345491 | 12/2003 |
| JP | 2004-028678 | 1/2004 |
| JP | 2004-133518 | 4/2004 |
| JP | 2006-260265 | 9/2006 |
| KR | 10-2006-0043337 | 5/2006 |
| WO | WO 00/04440 | 1/2000 |
| WO | WO 02/39712 | 5/2002 |
| WO | WO 2005/091122 | 9/2005 |
| WO | WO 2006/108617 | 10/2006 |

OTHER PUBLICATIONS

International Preliminary Report on Patentability, PCT application No. PCT/EP2008/058842.
International Preliminary Report on Patentability, PCT application No. PCT/EP2008/060343.
International Preliminary Report on Patentability, PCT application No. PCT/EP2008/060397.
International Search Report and Written Opinion, PCT Application No. PCT/EP2008/058842.
International Search Report and Written Opinion, PCT Application No. PCT/EP2008/060343.
International Search Report and Written Opinion, PCT Application No. PCT/EP2008/060397.
Search Report, German Patent Application No. 10 2007 039 442.1.
Search Report, German Patent Application No. 10 2007 039 446.4.
Search Report, German Patent Application No. 10 2007 039 444.8.
Korean Office Action, dated Apr. 11, 2015, issued in corresponding Korean Patent Application No. 10-2010-7004812.

* cited by examiner

METHOD FOR DISPLAYING INFORMATION IN A MOTOR VEHICLE WITH A VARIABLE SCALE AND DISPLAY DEVICE

FIELD OF THE INVENTION

The present invention relates to a method for displaying information with the aid of a display mounted in a motor vehicle, in which a user-interface device generates graphics data which control the display such that a graphical object is displayed, and in which one pixel of the display is selected with the aid of an input device, and a line is drawn on the display starting from this pixel. The present invention further relates to a display device for a motor vehicle having a display mounted in the motor vehicle, an input device by which one pixel of the display is selectable and a line is drawable on the display starting from this pixel, and a user-interface device by which graphics data are able to be generated that control at least one partial area of the display in such a way that a graphical object is displayed in which a display content is shown in a specific scale.

BACKGROUND INFORMATION

In a motor vehicle, there are various information and communication areas to which indicating instruments are assigned. They are used to provide information to the driver and passengers. Moreover, they are able to assist the driver in navigation or communication with the outside world. In particular, the display is able to visually represent vehicle data related to traffic or operation. What is termed the instrument cluster is disposed in the vicinity of the primary field of view of the driver. Usually it is located in the cockpit behind the steering wheel and is visible through an opening in the steering wheel. It is used especially to display the speed, the fuel-tank capacity, the radiator temperature and other motor-vehicle information specific to operation. In addition, radio and audio functions may be displayed. Finally, menus for telephone, navigation, telematic services and multimedia applications may be displayed. Usually liquid-crystal displays in various forms are used as display.

For example, German Published Patent Application No. 100 01 988 describes an instrument cluster for the display of operation-related and/or traffic-related data. To permit better comprehension of the diverse offering of information, German Published Patent Application No. 103 03 792 describes a perspective representation of three-dimensional elements.

As a further display device, a vehicle frequently possesses a multifunction display in the center console or above the center console. Such a multifunction operating element is described, for example, in German Published Patent Application No. 199 41 955.

In order to present the various operating and display possibilities in clearly arranged fashion, hierarchical menu structures are frequently used. A menu shows various menu items and, if applicable, graphics or icons assigned to the menu items. Upon selection of a menu item, a submenu having further submenu items opens. This structure may be continued over several hierarchical levels. In addition, instead of being assigned a submenu, a menu item may be assigned a specific display image, which represents the information assigned to the menu item.

If such menu structures are used in a motor vehicle, the problem arises that navigation within these menu structures and the absorption of the information indicated by the display claim the attention of the driver such that he is no longer able to safely drive the motor vehicle at the same time. Thus, if the driver wants to operate vehicle devices whose information is shown via the display device, he should do so prior to starting a trip or should interrupt his driving in order to operate them. However, such drawbacks for the user operation are undesirable. In many cases, the result is that the driver operates the devices in the vehicle while driving, although this leads to a distraction which can represent a safety risk.

It is therefore desirable that the information in the motor vehicle be displayed such that it may be comprehended quickly and intuitively by the driver, so that the acquisition of the displayed information does not cause the driver to be distracted while driving. Furthermore, the operation should be executable so intuitively, easily and quickly that the driver is able to operate the devices of the vehicle, whose information is displayed by the display device, while driving, as well, even if possibly complex hierarchical structures are displayable by the display device. The display of information and the operator control associated with a display of information in the motor vehicle thus contribute to safety when driving the motor vehicle.

Particularly when operating a navigation system of a motor vehicle, it is important that the driver, if necessary while driving, be able to very easily and intuitively alter the map segment displayed and the scale. When working with known navigation systems, in many cases for these functions it is necessary to carry out several operating steps that are performed with the aid of command buttons disposed separately from the geographical map. These command buttons are not operated intuitively on the geographical map already displayed, so that the operation frequently claims the attention of the driver to the extent that the operating steps cannot be performed while driving without leading to a safety risk in driving the vehicle.

SUMMARY

Example embodiments of the present invention provide a method and a display device of the type indicated at the outset, by which the scale of the display content of the graphical object is able to be altered as easily and intuitively as possible. With the alteration of the scale, it should further be possible to alter the segment of the display content.

In the method according to example embodiments of the present invention, the scale of the display content is altered as a function of the length of the line. Therefore, in the method, the user draws only one line on the display. The scale of the display content is thereby changed.

The scale of the display content may be reduced, the degree of the reduction corresponding to the length of the line. Using the input device, one pixel of the display may be selected. This is the starting point of the line. Moreover, after the line itself has been drawn on the display starting from the starting point of the line, the drawing of the line may be ended with the aid of the input device. For example, if the input device is the touch-sensitive surface of the display, the user only needs to let go of the display in order to complete the line. If the input device is a remote operating element such as a control of a cursor on the display, a separate operating element may be provided to end the cursor control, i.e., to end the line.

The display content reducing in scale is preferably shown in real time during the drawing of the line. In so doing, preferably the display content, which was contained in the original scale of the graphical object, may be shown in graphically contrasted fashion during the drawing of the line. For example, within the graphical object, a superimposed semitransparent layer may be displayed in which the display content of the original scale is represented. Upon the reduction of the scale, new display contents adjoin this original display content if the size of the graphical object remains unchanged. The graphics data for these new display contents are generated in real time by the user-interface device and shown on the display.

The scale of the display content may also be enlarged. In this case, starting from the selected pixel, a segment of the graphical object is formed during the drawing of the line, and after completion of the line, a new graphical object is displayed which shows the display content of the segment of the original graphical object in an enlarged scale. In this context, preferably the aspect ratio of the segment corresponds to the aspect ratio of the graphical object. In the case of a rectangular object, the aspect ratio is yielded from the ratio of the two sides of the rectangle which forms the object. If the object has a different geometric shape, the aspect ratio is yielded from the extension of the object in two directions perpendicular to each other.

In contrast to the reduction of the scale, in the case of the enlargement of the scale, the display content is first shown enlarged when the user has selected the new segment by completing the line. Therefore, the display content is not altered during the drawing of the line, except that possibly the opening of the segment is visually displayed.

It is possible to determine whether the scale is intended to be enlarged or reduced by the direction in which the line is drawn on the display. Therefore, in the method, the scale may be altered very easily and intuitively by the movement of a pixel on the display. In this context, it is also easily possible for the user to determine a segment which is to be shown in an enlarged scale.

The method may be used especially preferentially in conjunction with the navigation system of the motor vehicle. In this case, the display content is a geographical map of the navigation system. Upon the reduction of the scale of the geographical map in the graphical object, in particular, a larger segment of this map is displayed. Furthermore, within the map displayed, the user may select a segment which is to be displayed in an enlarged scale. In so doing, not only may the scale of the map change, but also the depth of detail of the representation. In a larger scale, further details of the geographical map such as further streets or points of interest may be added.

In the display device according to example embodiments of the present invention, the user-interface device is arranged such that the scale of the display content is altered as a function of the length of the line. If the scale of the display content is reduced, preferably the degree of the reduction corresponds to the length of the line.

Preferably, the user-interface device of the display device may include an arithmetic logic unit by which the display content reducing in scale is able to be calculated in real time during the drawing of the line.

For example, the input device of the display device may be a touch-sensitive surface of the display. With respect to the display device, it is sufficient that in the case of this touchscreen, only one touch position is detectable at any one time. It may be that it is also possible to use what are termed multi-touch screens which simultaneously detect the touching of the display at several positions. However, the use of multi-touch screens is not necessary. The more cost-effective, simple touchscreens, presently usable particularly in the motor vehicle with a lower expenditure, may also be used.

According to example embodiments of the display device, the input device is located remotely from the display. In this case, in particular the input device may have a cursor control familiar from the computer field. In addition, a multifunction operating device may also be used as described, for example, in European Published Patent Application No. 1 212 208.

The display device may be coupled in particular to a navigation system of the motor vehicle. In this case, the display content is especially a geographical map of the navigation system. Upon the reduction in scale of the geographical map in the graphical object, the arithmetic logic unit of the user-interface device may in this case calculate graphics data which represent a larger segment of the geographical map.

Further features and aspects of example embodiments of the present invention are described in more detail below with reference to the appended Figures.

DETAILED DESCRIPTION

Figure 1:
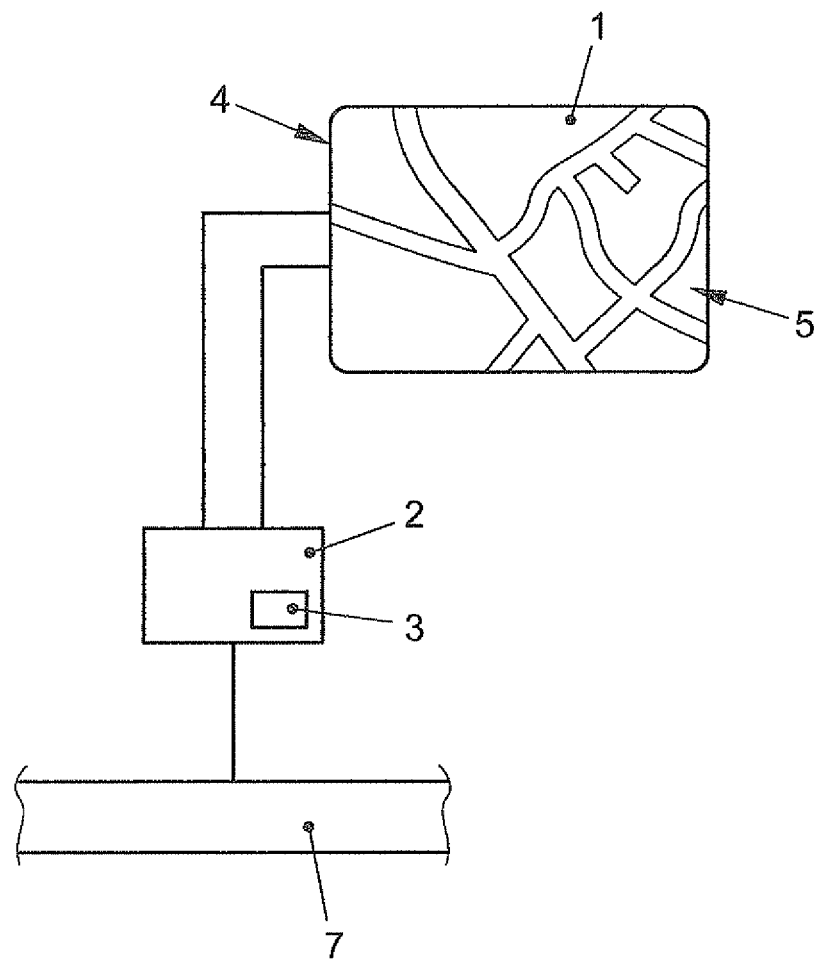
FIG. 1 shows schematically display device according to an example embodiment of the present invention, and the coupling of this display device to the electronics of the vehicle.

The display device includes a display 1 for the graphical representation of information. Display 1 may be a matrix display, e.g., an LCD (liquid crystal display), especially a color display using TFT (thin-film transistor) technology. Furthermore, the display may be what is referred to as a twisted nematic-liquid crystal display (TN-LCD), a super twisted nematic (STN) display, a double-layer STN, an FLC (ferroelectric liquid crystal) display or an SSFLC (surface stabilized ferroelectric liquid crystal). Assigned to display 7 is a back-lighting (not shown) which may be provided by one or more light-emitting diodes. Display 1 is freely programmable, that is, any desired graphics data may be generated, which are represented on display 1.

In particular, display 1 is mounted in an area of the vehicle that is clearly visible for at least the driver. If the operator control of the devices of the vehicle is directly coupled to the placement of the display, so that, for example, the user must bring his hand or his finger at least into the vicinity of display 1 in order to make inputs, then display 1 is positioned such that the driver of the vehicle may easily reach it with his hand or his finger. For instance, display 1 may be accommodated in the center console of the vehicle.

Display 1 is connected to a user-interface device 2, by which graphics data are able to be generated for graphical objects displayable on display 1. User-interface device 2 is also connected to an input device 4, via which the user is able to control devices of the vehicle whose information is displayed on display 1.

For example, input device 4 is a touch-sensitive foil which is provided on display 1. The position at which display 1 disposed behind the foil is touched may be detected by the foil. For example, the foil may take the form of a resistive touch foil, capacitive touch foil or piezoelectric foil. In addition, the foil may be constructed such that a flow of heat which goes out from the finger of a user, for instance, may be measured. Various inputs may be obtained from the evolution of the touching of the foil over time. For example, in the simplest case, the touching of the foil at a specific position may be assigned to one object displayed on display 1. Sliding movements of the finger over the foil may be interpreted, as well. In particular, in this manner, the user is able to define a line on display 1 by touching the foil at one point, sliding on the foil toward another point, and taking the finger off the foil at this other point.

Moreover, the input device may take the form of a remote operating element. In particular, the remote operating element is a cursor control for display 1.

User-interface device 2 is also connected to a vehicle bus 7. User-interface device 2 may be coupled to the navigation system of the vehicle via this vehicle bus 7. From the data transmitted from the navigation system, user-interface device 2 generates graphics data, which are represented on display 1. In the present case, this is especially a geographical map 5, which is displayed in a specific scale.

In the following, it is explained how the user is able to alter the scale or the segment of geographical map 5.

Figure 2:
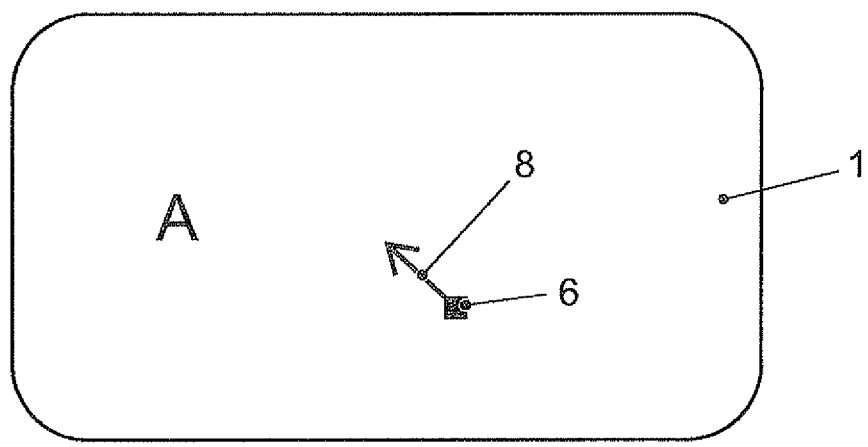
FIGS. 2 and 3 illustrate the reduction in the scale of the display content in the implementation of a method according to an example embodiment of the present invention.
Figure 3:
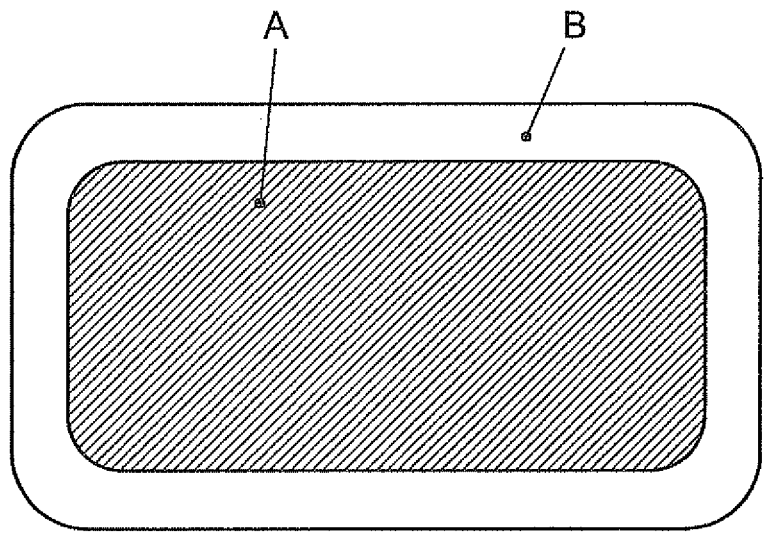

With reference to FIGS. 2 and 3, it is explained how the user is able to reduce the scale of map 5. The starting point is a geographical map 5, which is shown in area A of display 1. This area A may take up entire display 1 or a partial area of display 1. The area in which geographical map 5 is displayed is a graphical object, particularly a window-like graphical object. In the following, it is assumed that geographical map 5 fills up entire display 1.

In order to alter the scale of geographical map 5, the user selects one pixel 6 of display 1 with the aid of input device 4, that is, for example, by touching the touch-sensitive foil on display 1. Starting from this pixel 6, the user draws a line 8 on display 1. According to the convention of the exemplary embodiment described, the drawing of line 8 upward and to the left signifies a reduction in the scale of geographical map 5. Likewise, however, a different convention could also be selected in which drawing in a different direction leads to a reduction of the scale.

The reduction in the scale of geographical map 5 corresponds to the length of line 8. Arithmetic logic unit 3 of user-interface device 2 calculates the graphics data for the reducing scale in real time, while the user is drawing line 8. Therefore, during the drawing of line 8, geographical map 5 represented originally in area A of FIG. 2 is reduced, as shown in FIG. 3. Area A in FIG. 3 contains the same map content as area A in FIG. 2, with the difference that the scale in FIG. 3 is reduced. Moreover, during the drawing of line 8, user-interface device 2 calculates in real time the graphics data for the map content for area B becoming free, which adjoins area A, and specifically for the scale in which geographical map 5 is also displayed in area A.

Furthermore, during the drawing of line 8, the part of geographical map 5 which was contained in the original scale A of FIG. 2 is shown in graphically contrasted fashion. For example, a semitransparent layer may be displayed over this area. In this manner, the user is able to easily recognize by how much he has reduced the scale of geographical map 5. When the user terminates line 8, for example, by letting go of display 1, geographical map 5 remains in the altered scale, and the highlighting of the original map content disappears.

Figure 4:
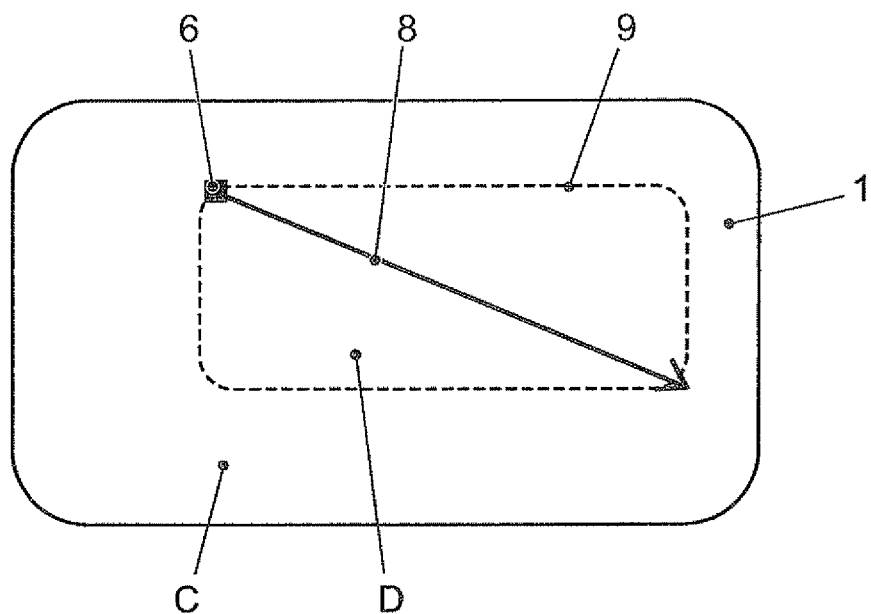
FIGS. 4 and 5 illustrate the enlargement of the scale of the display content in the implementation of the method according to an example embodiment of the present invention.
Figure 5:
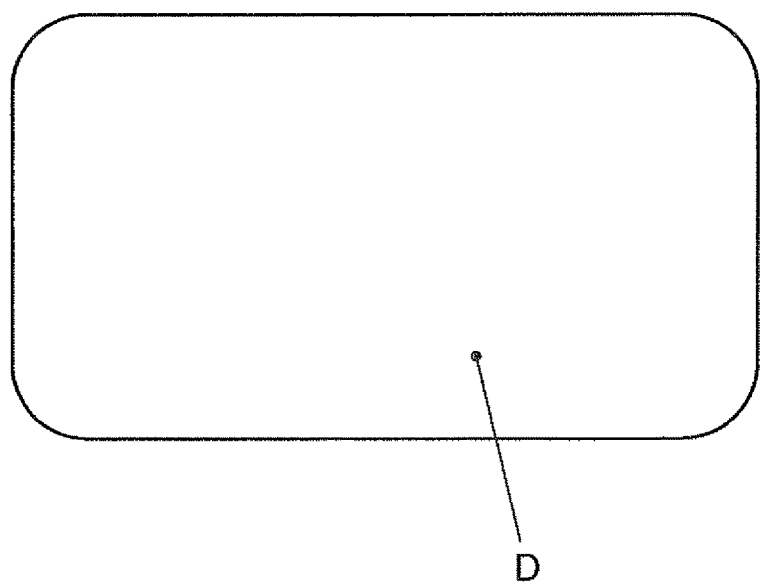

In the following, with reference to FIGS. 4 and 5, it is explained how the scale of geographical map 5 is enlarged:

Using input device 4, that is, by touching the touch-sensitive foil on display 1, the user selects one pixel 6 on display 1 in this case, as well. Starting from this pixel 6, according to the convention of the exemplary embodiment described, he draws a line 8 downward and to the right. The user thereby draws a window 9 open which has the same aspect ratio as display 1 or the window in which map 5 is represented.

When enlarging the scale of geographical map 5, however, the altered scale is not calculated and displayed during the drawing of line 8. Rather, the user is shown only one window 9 as segment D of the original geographical map, which is displayed in area C, that is, in the present case, in entire display 1. However, a segment D within area C is defined by window 9. After the user has finished drawing line 8, that is, for example, after letting go of display 1, arithmetic logic unit 3 of user-interface device 2 calculates graphics data which represent segment D in an enlarged scale, so that segment D fills up entire display 1.

LIST OF REFERENCE NUMERALS

1 Display
2 User-interface device
3 Arithmetic logic unit
4 Touch-sensitive foil of display 1
5 Geographical map
6 Pixel
7 Vehicle bus
8 Line
9 Window

The invention claimed is:

1. A method for displaying information via a display mounted in a motor vehicle, comprising:
generating, by a user-interface device, graphics data adapted to control the display to display a graphical object in which a display content is shown at a specific scale;
selecting a pixel of the display with the aid of an input device;
drawing a line on the display starting from the pixel;
altering the scale of the display content as a function of a length of the line, the degree of altering proportional to a value the length of the line; and
showing the display content included in an original scale of the graphical object in graphically contrasting manner during the drawing of the line;
wherein the altering includes reducing the scale of the display content in real time during the drawing of the line, a degree of the reduction corresponding to the length of the line, and enlarging the scale of the display content after the line is completed.

2. The method according to claim 1, further comprising:
forming a segment of the graphical object starting from the selected pixel during the drawing of the line; and
after the line is completed, displaying a new graphical object showing the display content of the segment of an original graphical object in an enlarged scale.

3. The method according to claim 2, wherein an aspect ratio of the segment corresponds to an aspect ratio of the graphical object.

4. The method according to claim 1, wherein the display content includes a geographical map of a navigation system.

5. The method according to claim 4, further comprising displaying a larger segment of the geographical map upon reduction of the scale of the geographical map in the graphical object.

6. The method according to claim 1, wherein the showing the display content includes displaying a superimposed semitransparent layer of the display content included in the original scale.

7. The method according to claim 1, wherein the scale is altered to be reduced or enlarged based on a direction in which the line is drawn on the display.

8. A display device for a motor vehicle, comprising:
a display mounted in the motor vehicle;
an input device adapted to select a pixel of the display and to draw a line on the display starting from the pixel; and
a user-interface device adapted to generate graphics data to control at least one partial area of the display to display a graphical object in which a display content is shown in a specific scale, to show the display content included in an original scale of the graphical object in graphically contrasting manner during the drawing of the line;
wherein the user-interface device is adapted to alter the scale of the display content as a function of a length of the line, the degree of altering proportional to the length of the line, the altering including reducing the scale of the display content in real time during the drawing of the line, a degree of the reduction corresponding to the length of the line, and enlarging the scale of the display content after the line is completed.

9. The display device according to claim 8, wherein the user-interface device includes an arithmetic logic unit adapted to calculate the reduction in scale in real time during the drawing of the line.

10. The display device according to claim 8, wherein the input device includes a touch-sensitive surface of the display.

11. The display device according to claim 8, wherein the input device is located remotely from the display.

12. The display device according to claim 8, wherein the display device is coupled to a navigation system, and the display content includes a geographical map of the navigation system.

13. The display device according to claim 12, wherein an arithmetic logic unit of the user-interface device is adapted to calculate graphics data representing a larger segment of the geographical map upon the reduction of the scale of the geographical map in the graphical object.

* * * * *